Oct. 4, 1932.  F. M. CARROLL  1,880,417
COMPUTING SCALE
Original Filed Oct. 31, 1927  5 Sheets-Sheet 1

Inventor
Fred M. Carroll
By his Attorney
W. M. Wilson

Oct. 4, 1932.  F. M. CARROLL  1,880,417
COMPUTING SCALE
Original Filed Oct. 31, 1927   5 Sheets-Sheet 2

Oct. 4, 1932.  F. M. CARROLL  1,880,417
COMPUTING SCALE
Original Filed Oct. 31, 1927    5 Sheets-Sheet 4

Inventor
Fred M. Carroll
By his Attorney

Oct. 4, 1932.   F. M. CARROLL   1,880,417
COMPUTING SCALE
Original Filed Oct. 31, 1927   5 Sheets-Sheet 5
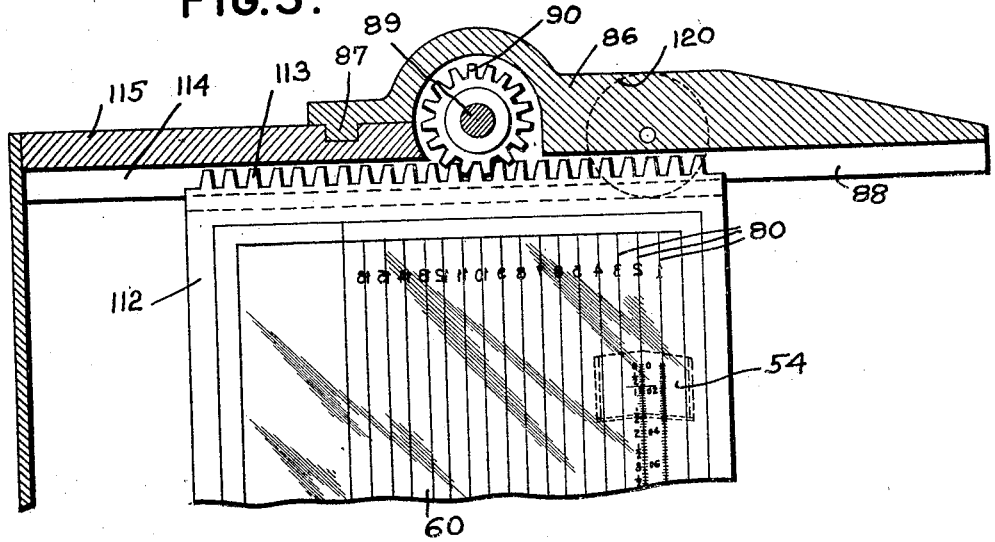
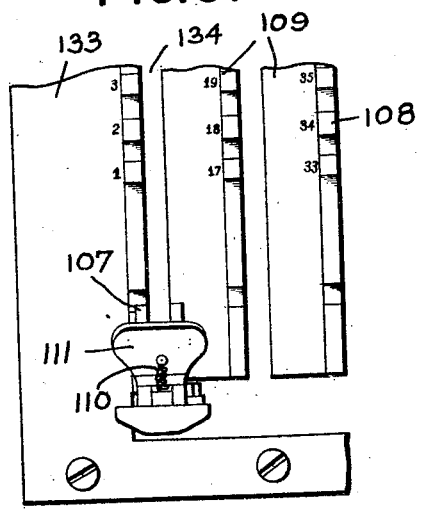
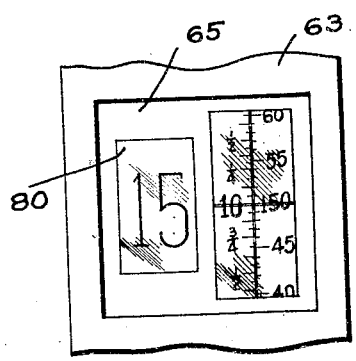

Patented Oct. 4, 1932

1,880,417

UNITED STATES PATENT OFFICE

FRED M. CARROLL, OF YONKERS, NEW YORK, ASSIGNOR TO DAYTON SCALE COMPANY, OF DAYTON, OHIO, A CORPORATION OF NEW JERSEY

COMPUTING SCALE

Original application filed October 31, 1927, Serial No. 229,895. Divided and this application filed November 23, 1928. Serial No. 321,316.

This case is a division of application, Serial No. 229,895, filed by me October 31, 1927, for computing scales and is concerned particularly with the novel chart structure of the scale.

In such scales, the chart is provided with a plurality of price scales, each based on a particular price per pound. It is obviously desirable to provide a scale with as many different price scales as possible. Statutory requirements and the need for furnishing a clear and easily read indication limit the number of price scales which may be placed on a chart of a given size. The size of the chart is in turn limited by the maximum load capacity of the scale. The problem, confronted by these limitations, is to increase the number of price scales in a given capacity scale.

The object of this invention is to solve the aforesaid problem in a simple, convenient, and practical manner. This is accomplished, broadly, by providing a number of price scale charts, each having a different range of price scales.

More specifically, the object of the invention is to provide a number of price scale charts which may be individually, selectively, and adjustably positioned for cooperation with the scale index line.

Further, the object of the invention is to provide a holder for all the charts which is movable in accordance with the chart to be selected for reading.

Still further, the object is to provide means for moving the scale chart selected for reading into adjustable relation with the index means.

Another object is to provide a single element for conveniently locating each chart definitely in position.

Further and other objects and advantages will be hereinafter set forth in the accompanying specification and claims, and shown in the drawings, which by way of illustration show what is now considered to be the preferred embodiment of the invention.

Fig. 5 is a detail of a chart and its price scale adjusting means;

Fig. 6 is a front detail view of the chart and rate selection indicator;

Fig. 7 is a view of the reading obtained at the customer's side of the scale to which the invention has been applied.

For the purposes of illustration, the invention is shown and described in connection with an optical scale, described in detail in the copending parent application, referred to above.

Figure 1:
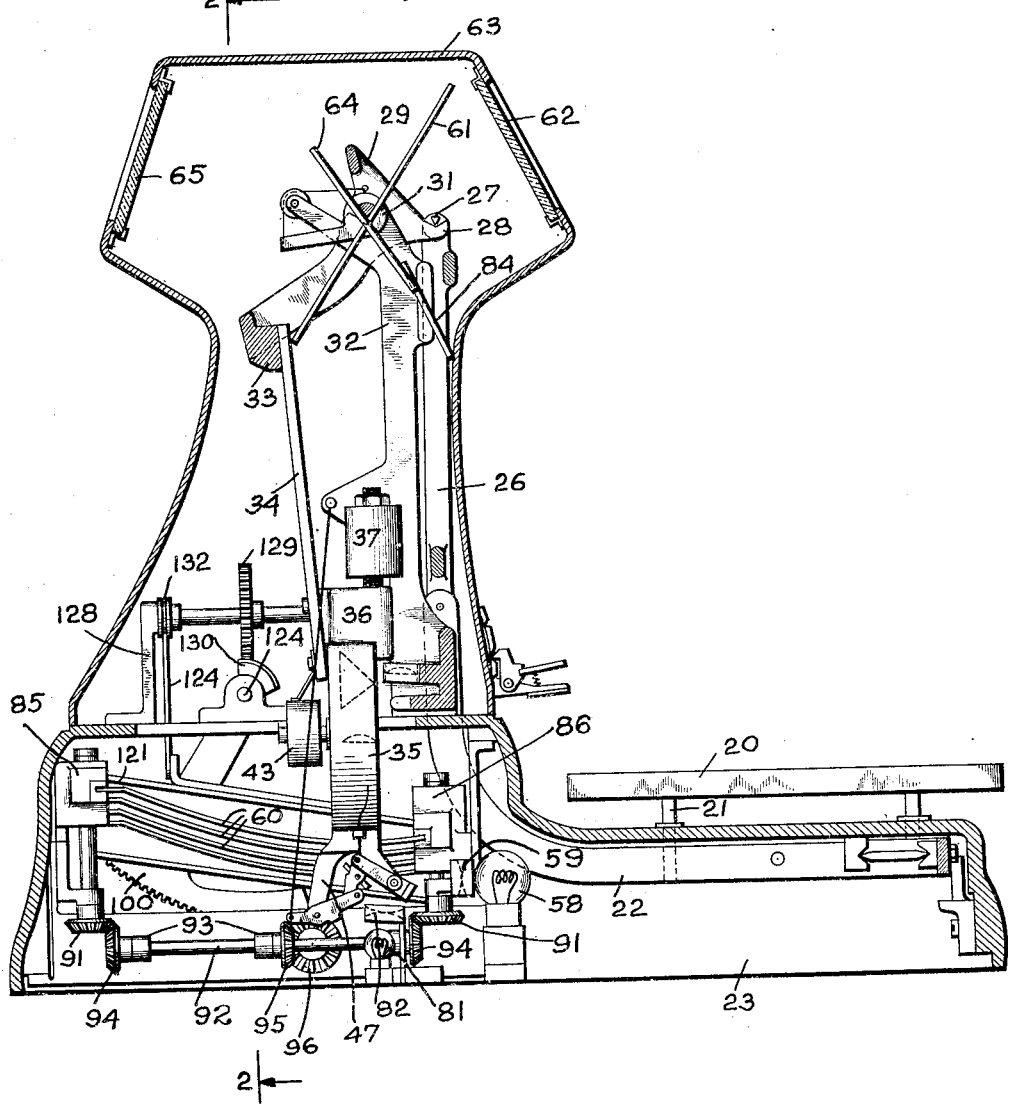
Fig. 1 is a side section through the weighing scale.
Figure 2:
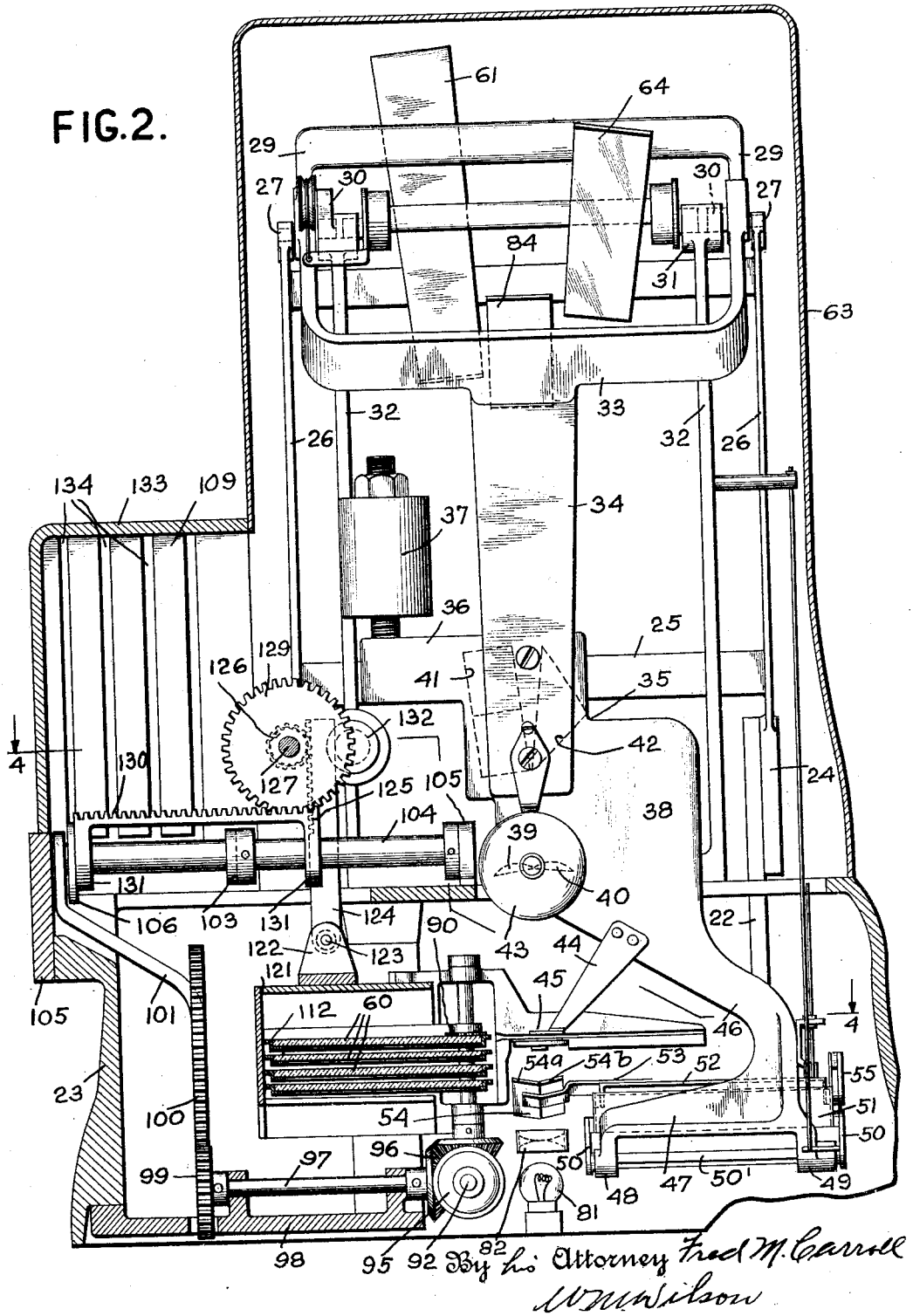
Fig. 2 is a section on line 2—2 of Fig. 1.

Referring to Figs. 1 and 2, the scale comprises a platform 20 upon which the object to be weighed is placed. The weight of the object displaces through rods 21 a curved link 22, the horizontal portion of which is disposed within the part of base 23 located beneath the platform. The vertical part of link 22 is pinned to a depending extension 24 of a rectangular framework 25, the vertical legs 26 of which have knife edge bearings 27 at their upper ends resting upon wedge shaped bearing recesses 28 formed in the sides 29 of a load offsetting mechanism or pendulum (Fig. 1). Spaced from the bearing recesses 28 the sides 29 have knife edges 30 (Fig. 2) projecting at right angles therefrom and journalled in bearings 31 formed at the upper end of standards 32 supported on the top of base 23. Integrally connecting the sides 29 of the pendulum is a cross piece 33 having a central depending extension 34. The lower end of said extension has bolted to it a framework 35 having a horizontal beam 36 carrying an adjusting weight 37. The framework proper consists of a vertically disposed housing 38 (Fig. 2) carrying double convex reversing lenses 39 and 40 and triangular prismatic lenses 41 and 42. The lenses 41 and 42 are disposed with the triangular faces of one at right angles to the triangular face of the other.

Figure 4:
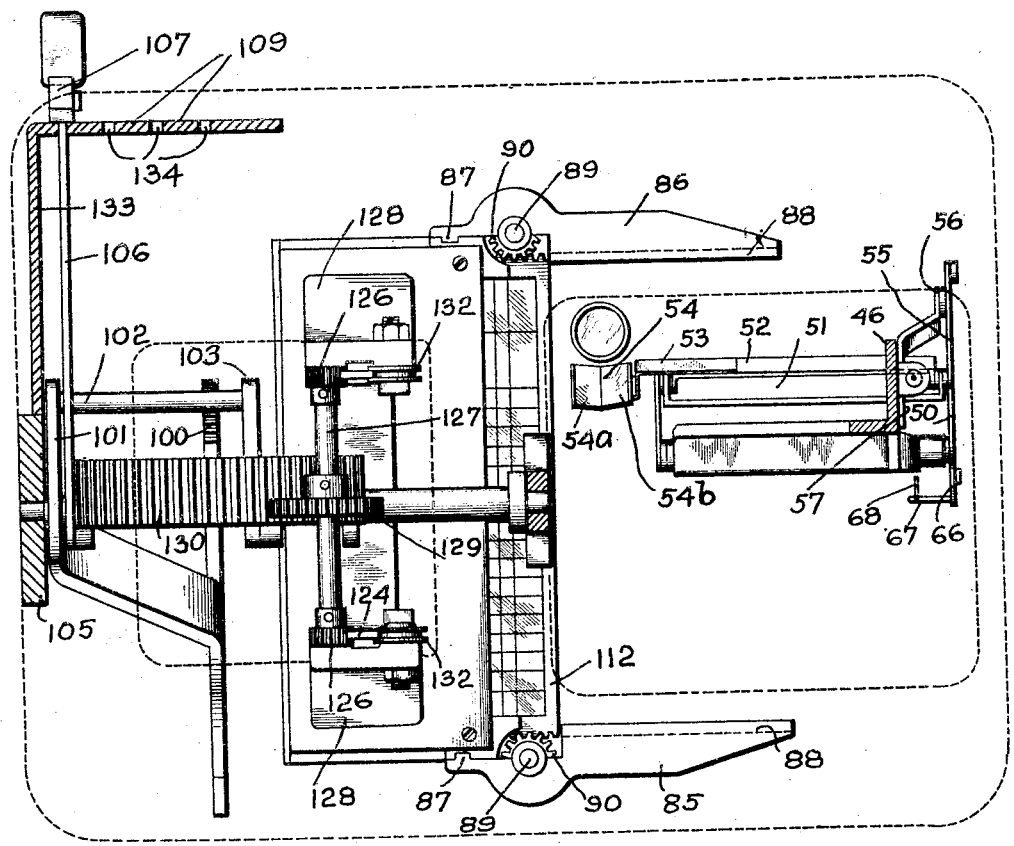
Fig. 4 is a section on line 4—4 of Fig. 2.

An adjusting nut 43 is rotatably mounted on a threaded bolt attached to one of the side plates of the housing 38 at right angles to previously mentioned adjusting nut 37. Bolted to the side of housing 38 is a support 44 carrying a hair line 45 (Fig. 2). The side plates of the housing merge into a solid curved leg 46 which terminates in a bifurcated structure 47 formed with two spaced bearing lugs 48 and 49. Links 50 connected by integral plate 50' are journalled in said lugs and pivoted to the sides of a housing 51 (Figs. 2 and 4). Intermediate its ends, the housing 51 has pivoted thereto a carrier 52 to the end of which is rigidly attached a bracket 53 carrying a reflector 54. A lever 55 is pivoted at one end to the upper part of one of the sides of housing 51 and is pivoted at its other end to a lower extension 56 of a plate 57 fixed to leg 46 (see Fig. 4).

The reflector 54 comprises two mirrors 54a and 54b (Figs. 2 and 4) at an angle to each other. Both mirrors when the pendulum is in zero position make an angle of approximately 45° to the horizontal. A stationary lamp 58 (Fig. 1) is mounted within the base 23. Adjacent the lamp is a condenser lens 59 which concentrates a horizontal beam of light upon the mirrors 54. The mirrors reflect the beam when the pendulum is at zero position approximately in a vertical direction. The direction of the reflected beam must be such that the beam will always be cut by the weight indicating means which in this case is the hair line 45. It is understood that the pendulum is adjusted so that the hair line indicates zero on the chart 60 when there is no weight on the platform. Referring to Fig. 2 from mirror 54b, the reflected beam passes through the stationary weight and rate chart 60 of transparent material at a point thereof which is covered by the hair line 45. This point of the chart bears the reading corresponding to the weight on the platform. The beam carrying an image of the reading then passes through lens 40, and prismatic lens 42, which casts the image upon a mirror 61.

The latter projects the image upon a ground glass screen 62 (Fig. 1) mounted in the housing 63 at the side thereof which is in sight of the clerk. From mirror 54a, the beam is projected through the chart 60 at the point thereof, previously mentioned, which carries the reading indicated by the hair line 45. The image carrying beam then passes through lenses 39 and 41 and is cast upon a mirror 64 which reflects it to a ground glass screen 65 mounted in the side of the housing 63 opposite the side thereof in which screen 62 is mounted and which is in view of the customer. The reflected beams intersect each other and the chart at the point of the chart which is beneath the hair line 45, so that both beams carry images of the same reading.

Together with the rate and weight reading, it is desirable to show the customer the image of the price rate of the article. The scale chart 60, as shown in Fig. 5, has a plurality of different rates 80 inscribed thereon. When a chart, by means hereinafter described, is adjusted to position a selected rate scale for reading by the optical system described, the rate indication 80 of the selected scale is directly in line with a beam projected from stationary lamp 81 (Figs. 1 and 2) through a condenser lens 82. The image of the rate indication is cast upon a mirror 84 fixed to the frame 32 and mirror 84 casts the rate image upon screen 65. The position of the rate image relative to the scale reading is shown in Fig. 7.

The charts 60 are curved in conformity to the arc of movement of the pendulum in such a manner that the hair line 45 is always at the same distance from the surface of the chart.

Figs. 1 to 5 illustrate the means for selecting a rate scale on a chart for cooperation with the reading means previously described. The base 23 is provided with a pair of brackets 85 and 86, each having vertical guide ribs 87 (Figs. 4 and 5) and horizontal guide slots 88. A pair of shafts 89, each carrying a pair of gears 90 and bevel gears 91 are journalled in the brackets (see Fig. 3). At right angles to the shafts 89, a shaft 92 is journalled in a frame member 93 rigidly attached to the base 23. The shaft 92 is provided with bevel gears 94 at its ends meshing with gears 91 and intermediate its ends has a bevel gear 95 meshing with a bevel gear 96 on the end of a shaft 97 journalled at right angles to shaft 92 in a frame 98 rigidly attached to base 23 (Fig. 2). The opposite end of shaft 97 has a gear 99 rotated by a segmental gear 100 formed on the end of an arm 101. A rod 102 (see Fig. 4) is fixed at one end to the free end of arm 101 at right angles thereto and has attached to its opposite end an arm 103 fixed to a shaft 104. Arms 101 and 103 rotate with shaft 104 which is freely journalled at its ends in standards 105 mounted on the base 23. A lever 106 is journalled at one end on shaft 104 and intermediate its ends has an opening for receiving rod 102. The free end of the lever has a pawl 107 pivoted thereon and urged into engagement with notches 108 in a selected one of a plurality of arcuate racks 109 by means of a spring 110 (Figs. 3 and 6) positioned between the end of the lever and a plate 111 fixed to the pawl. By grasping the plate 111 and the end of the lever, the pawl 107 may be disengaged from the rack 109 and the lever oscillated on shaft 104. As the lever swings, it carries rod 102 with it which in turn causes arm 101 and the rack 100 on its end to oscillate about the center of shaft 104. Rack 100 drives shaft 97 through gear 99 and shaft 97 in turn drives shaft 92 through meshing gears 95 and 96. Upon rotation of shaft 92, gears 94 rotate shafts 89 through gears 91.

Each chart 60 is carried by an open rectangular frame 112, (see Figs. 4 and 5), a pair of opposite sides of which have racks 113 adapted to mesh with gears 90 on shafts 89. The racks are slidably guided in slots 114 formed in the sides of a pair of members 115, having vertical guide slots fitting the vertical guide ribs 87 on bracket members 85 and 86.

Referring to Fig. 5, it may be seen that the list of rates 80 is located on the scale chart on a line parallel to the racks 113. At right angles to the line of price rates and in alignment with each rate figure is a graduated scale of weights and corresponding totals equal to the product of the rate and the weights. Each chart has, in this instance, sixteen different rates and corresponding graduated rate and weight scales. The pendulum reading means is adapted to oscillate along one of the graduated rate and weight scales, as seen from Figs. 4 and 5. Corresponding to each rate on the chart is one of said notches 108. The notches are marked alongside with a corresponding rate. When a particular rate is desired, the pawl 107 is released from the notch it is then engaging and the lever 106 swung to a position where pawl 107 may engage the notch which is marked with the rate desired. In this movement, the rack 100 actuated by lever 106, effects rotation of shafts 89, as above described, which through gears 90 and racks 113 move the chart 60 an amount proportional to the movemnt of lever 106. Thus, if pawl 107 engages the notch 108 marked 2 (see Fig. 6) the chart will have been moved to a position where the rate and weight line marked 2 will overlie the mirrors 54 as shown in Fig. 5. The brackets 85 and 86 have rollers 120 which bear against the sides of chart holders 112 immediately below the rack teeth and in addition to reducing friction assist in holding the chart so that the desired rate scale when in reading position lies at right angles to the hair line 45 of the pendulum.

To provide a large range of rates, a plurality of scale charts 60 are used, each having sixteen different rates. The chart shown in Fig. 5 has rates 1 to 16. The chart below has rates 17 to 32, still another has rates 33 to 48, and so on. While only four charts are shown, each having sixteen rates, it is obvious that more or less than four charts having any convenient number of rates may be employed. As stated, the charts are mounted in holding frames 112 slidably carried by members 115.

Figure 3:
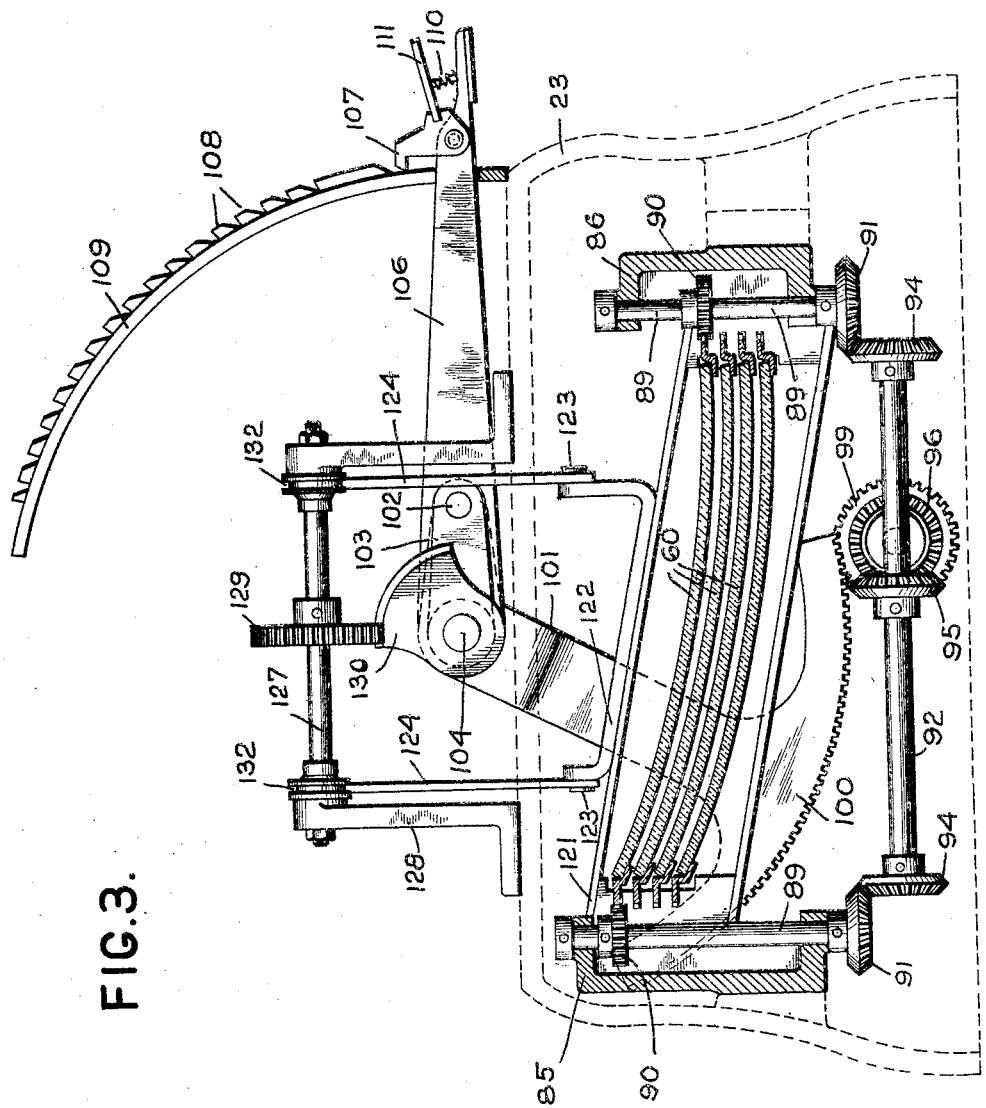
Fig. 3 is a detail view of the chart assembly showing the mechanism for adjusting the positions of the charts.

When any particular chart is desired for cooperation with the optical reading system, the holder 112 of the selected chart is first moved to position where its racks 113 are in mesh with gears 90 which upon rotation then move the chart to various rate positions. The movement of the holder 112 to meshing position with gears 90 is effected by moving the members 115 in which all the holders 112 are carried in a vertical direction relative to brackets 85 and 86, being guided in this movement by ribs 87 of the brackets. Referring to Figs. 2 and 3, the top of members 115 have attached thereto a plate 121 on which is mounted a bracket 122, provided with a pair of vertical legs having aligned bearing or journal pins 123. Rotatably mounted on these pins are a pair of links 124, the upper portions of which have on one edge a series of rack teeth 125 adapted to cooperate with a pinion gear 126 fixed to a shaft 127 journalled in standards 128 mounted on the base. Intermediate the ends, shaft 127 has fixed to it a gear 129 which meshes with rack teeth 130 slidably mounted by means of a pair of sleeves 131 on the shaft 104. One side of the left sleeve 131 is rigidly attached to the shaft receiving portion of lever 106 which is freely slidable on the shaft and the rod 102 parallel to the shaft. The movement of lever 106 along the shaft and rod carries with it the rack 130 which thereupon actuates gear 129 to effect rotation of shaft 127. Gears 126 on the latter shaft thereupon actuate links 124 through rack teeth 125, the links being limited to vertical movement by a pair of guiding rollers 132. Upon movement of links 124, the members 115 to which they are attached by plate 123 also move in a vertical direction carrying the chart holders 112 with them. In Fig. 2, the upper chart holder is shown in position for coaction with rate adjusting gears 90. By sliding rack 130 the proper distance along shaft 104, any one of the other charts may be brought into cooperation with gears 90. The amount of movement of rack 130 along shaft 104 required to bring a chart into position for coaction with gears 90 is determined by a series of slots 134, each corresponding to a chart, cut in the housing extension 133 (Figs. 2, 3 and 6).

Alongside each slot is one of the aforementioned racks 109 having the notches 108. When a particular chart is to be selected for reading, the pawl 107 on lever 106 is released from the notch 108 it is then engaging and the lever lowered below the racks 109. This causes the chart which had been in reading position with a portion extending into slot 88 (see Fig. 2) to move to its inactive position out of slot 88 so it will not interfere with vertical movement of holders 115. The lever 106 is then moved along shaft 104 till it is below the slot 134 corresponding to the selected chart. In this movement of the lever, the rack 130 will have effected the required vertical movement of members 115 to bring the desired chart into coaction with gears 90 and in line with guide slot 88. In order to then select the required rate on the selected chart, the lever is moved upwards along the slot 134 till it reaches the notch 108 in the rack 109 to the left of the slot which is marked with the desired rate, as shown in Fig. 6. The movement of the lever along the slot rotates rate-adjusting gears 90 through arcuate gear 100 as previously explained. When the lever is opposite the proper notch 108, pawl 107 is released to engage the notch and hold the lever in adjusted position.

It will be understood that lamps 58 and 81 are furnished with current in any convenient manner, the current being turned off when the scale is not in use.

The operation of the scale will be understood from the previous description. To summarize, when weighing an article, the operator knowing the rate at which are article is to be sold, moves the lever 106 to the notch 108 which is marked with said rate. This will automatically position the chart and the proper rate on the chart for cooperation with the reading system. For example, if rate 34 is to be used, the pawl 107 is engaged in notch 34 (see Fig. 6) which brings the rate scale 34 on the third chart from the top (as seen in Fig. 2) into cooperation with the reading system.

The current is then turned on to light the lamps and the article placed on the platform. The pendulum will then be displaced a distance proportional to the weight of the article and position hair line 45 over the proper portion of the chart. Mirror 54b, lenses 40, 42 and mirror 61 will then project a magnified image of the total cost and weight of the article upon screen 62 in view of the clerk. Mirror 54a, lenses 39 and 41 and mirror 64 will project the same image on screen 65 in view of the customer. At the same time, lenses 82, 83 and mirror 84 will project the price per pound indication on the customer's screen.

While the invention has been shown and described in connection with an optical scale, it is understood that the principles of the invention are applicable equally well to other types of scales. Thus the charts may be read directly, the pendulum hair line serving as an index line, the position of the chart and the hair line being made suitable to the convenience of the user. These and other variations in the structure may be made by the exercise of mere mechanical skill by those skilled in the art without departing from the spirit of the invention. I intend to be limited therefore only as indicated by the scope of the following claims:

1. In a weighing scale wherein a chart reading device is provided for movement in a certain path, a chart, means for moving said chart to a position alined with and at the side of the path of movement of said device, means for thereafter moving said chart substantially into the path of movement of said reading device to enable the latter to read the chart and a single manually manipulative member to actuate both means, said member being movable in one direction to operate said first-mentioned means and movable in another direction to operate said second-mentioned means.

2. In a weighing scale wherein a chart reading device is provided for movement in a certain path, a chart, means for moving said chart to a position alined with and at the side of the path of movement of said device, means for thereafter moving said chart substantially into the path of movement of said reading device to enable the latter to read the chart and said second-mentioned means being adapted to move said chart different amounts into the path of the reading device whereby the latter may read different selected portions of the chart.

3. In a scale in which a chart-reading device is provided; a chart, means for imparting a translatory movement to the chart in a certain direction to place it in an initial position for cooperation with said reading device, and means for thereafter imparting a translatory movement in a direction other than aforesaid direction for selectively locating desired portions of the chart into cooperative relationship with the said reading device.

4. In a scale in which a chart-reading device is provided; a chart having a plurality of rows of graduations, means supporting the chart in cooperative relationship with said reading device, means for actuating said chart relative to the supporting means to select one of the chart rows for reading by said device, and a chart receiver, said actuating means being adapted to transfer said chart from said supporting means to said receiver.

5. In a scale in which a chart-reading device is provided; a chart, a frame therefor, a support for holding the chart in cooperation with the reading device, a second support for normally holding the chart, and coacting elements for moving said chart different predetermined amounts from the second to the first support into cooperative relationship with the reading device, one of said elements being provided on the chart frame.

6. In a measuring instrument having provisions whereby a chart may be read when in a predetermined position; a chart, a frame therefor, a support for holding the chart and frame, coacting elements for moving said chart and frame relative to said support to selectively locate different portions of said chart in aforesaid predetermined reading position, one of said elements being provided on the chart frame, manually manipulative adjustable means including a handle to actuate said elements and an indicator to indicate the position of the chart relative to the reading device.

7. In a measuring instrument having provisions whereby a chart may be read when in a predetermined position; a chart, a frame therefor, a support for holding the chart and frame, coacting elements for moving said chart and frame relative to said support to selectively locate different portions of said chart in aforesaid predetermined reading position, one of said elements being provided on said chart frame, manually adjustable means provided to actuate said elements, and a retaining device provided to retain the adjustable manual means in any of its set positions.

8. In a scale in which a chart-reading device is provided; a plurality of effectively rigid charts, each bearing a plurality of rows of graduations, means for imparting a translatory movement to the charts transverse to their surfaces for successively moving said charts to a predetermined position, the last row of graduations on each chart forming a progressive series with the first row on the next succeeding chart, and means for imparting a translating movement to one of the charts selectively when at said position for cooperatively associating one of its rows with the reading device.

9. In a measuring instrument having means whereby a chart may be read; a plurality of charts, each bearing a plurality of rows of graduations, means for successively moving said charts to a predetermined position, the last row of graduations on each chart forming a progressive series with the rows on the next succeeding chart, means for moving one of the charts selectively when at said position for cooperatively associating one of its rows with the reading means, a plurality of indicators, each indicator corresponding to a chart and marked with indicia corresponding to the rows on said chart, and a member provided to move both the means for successively moving the charts to a predetermined position and the means for moving the chart at said position, said member being adapted to cooperate with one of said indicators at a time to designate the chart row which has been moved into cooperation with the reading device.

10. In a measuring instrument having means whereby a chart may be read; a plurality of charts, each bearing a plurality of rows of graduations, means for successively moving said charts to a predetermined position, the last row of graduations on each chart forming a progressive series with the rows on the next succeeding chart, means for moving one of the charts selectively when at said position for cooperatively associating one of its rows with the reading means, a plurality of columns of indicators, each corresponding to one of the charts and bearing indicia corresponding to the rows on said chart, a member movable along one of the indicator columns at a time for actuating the second-mentioned chart-moving means, and movable from one column to another for actuating the first-named chart-moving means.

11. In a weighing scale in which a chart-reading device is provided; a plurality of charts, means for successively moving said charts to a predetermined position, means for moving a chart at said predetermined position into cooperation with the said reading means, an operating member, connections between the member and the first-named means for operating the latter upon movement of the member in a certain direction, and connections between the member and the second-named means for operating the latter upon movement of the member in a different direction.

12. In a measuring instrument having reading means; a housing, a plurality of charts within the housing, a manipulable device, said housing having a slot extending in one direction and a plurality of intersecting slots extending in another direction, each intersecting slot corresponding to one of the charts, said device extending through the slots to the outside of the housing, means inside the housing operated by said device for selecting one of the charts for coaction with said reading means upon movement of the device along said first-named slot into alinement with the corresponding intersecting slot, and means inside the housing operated by said device upon movement of the latter along one of the intersecting slots for moving the corresponding chart different distances relative to the reading means.

13. In a measuring instrument having reading means movable in an arcuate path; an effectively rigid chart curved similarly to the path of the reading means, a device for locating the chart contiguous to the reading means with its curvature disposed parallel to the path of movement of the reading means to be scanned by said reading means, and a device for moving the chart along its own plane in a direction substantially at right angles to the direction of movement of the reading means to position different parts of the chart for scanning by the indicating means.

14. In a measuring instrument having arcuately movable reading means; a plurality of effectively rigid arcuate charts, each curved in one direction similarly to the arcuate path of said reading means and having rows of graduations disposed parallel to each other and extending in the direction of curvature of the chart, a device for locating one of the charts at a time contiguous to the reading means with its curvature disposed parallel to the path of the reading means, and a device for moving the chart transversely to the direction of movement of the reading means to select one of the chart rows for coaction with the reading means.

15. In a measuring instrument having reading means movable in an arcuate path; a plurality of charts curved in one direction similarly to the path of the reading means, a support arranged to carry one arcuate chart at a time contiguous to the reading means with the curvature of the chart disposed parallel to the path of the reading means for scanning by the latter, and a device for selecting the chart to be carried by said support.

16. In a measuring instrument, the sub-combination comprising a chart member, a rack provided on an edge of said member, means for guiding the chart member for translatory movement, a pinion meshed with the rack, a device for operating the pinion to move the rack and chart member along said guiding means, and an indicator for indicating the movement of said chart member.

17. In a measuring instrument having reading means; a chart member, a guide for guiding the chart for translatory movement, a rack carried by an edge of the chart member, a pinion meshed with the rack, a device for supporting the chart member in a position to be read by the reading means, and means for rotating said pinion to transfer the rack and chart member from the guide to the chart supporting device.

18. In a measuring instrument, the sub-combination comprising a holder, a plurality of charts carried by the holder, a frame having means for guiding the holder for translatory movement, a gear rotatably carried by the frame, a pivoted device having an arcuate rack with teeth disposed at right angle to the axis of said device and in mesh with said gear, means for actuating the device parallel to its axis to rotate said gear, connections between said gear and holder for moving the latter along said guiding means to locate one chart at a time in a predetermined position, and connections between said device and the chart in said position effective upon pivotal movement of the device for moving the latter chart relative to the holder, said arcuate rack remaining in mesh with the coacting gear during said pivotal movement of the device without affecting said gear.

In testimony whereof I hereto affix my signature.

FRED M. CARROLL.